United States Patent
Palm

(10) Patent No.: US 9,797,316 B2
(45) Date of Patent: Oct. 24, 2017

(54) OPERATING METHOD AND DEVICE FOR PERFORMING OPEN-LOOP OR CLOSED-LOOP CONTROL FOR A PERMANENT BRAKE SYSTEM OF A VEHICLE

(71) Applicant: MAN TRUCK & BUS AG, München (DE)

(72) Inventor: Rüdiger Palm, München (DE)

(73) Assignee: MAN Truck & Bus AG, Munich (DE)

( * ) Notice: Subject to any disclaimer, the term of this patent is extended or adjusted under 35 U.S.C. 154(b) by 0 days.

(21) Appl. No.: 15/282,271

(22) Filed: Sep. 30, 2016

(65) Prior Publication Data
US 2017/0096947 A1     Apr. 6, 2017

(30) Foreign Application Priority Data
Oct. 1, 2015   (DE) .................. 10 2015 012 735

(51) Int. Cl.
G06F 7/70       (2006.01)
F02D 9/06       (2006.01)

(52) U.S. Cl.
CPC ..................... F02D 9/06 (2013.01)

(58) Field of Classification Search
CPC ........................................... F02D 9/06
USPC ...... 701/70; 303/3, 4, 6.01, 9.66, 9.71, 9.72, 303/9.73, 11, 15, 16, 17, 122.01–199, 303/112–119.3
See application file for complete search history.

(56) References Cited

U.S. PATENT DOCUMENTS

| | | | |
|---|---|---|---|
| 5,667,286 A * | 9/1997 | Hoying | B60T 8/1755 303/140 |
| 8,225,769 B2 | 7/2012 | Dilly | |
| 8,931,456 B2 | 1/2015 | Rammer et al. | |
| 9,193,339 B2 * | 11/2015 | Yao | B60T 8/3215 |

(Continued)

FOREIGN PATENT DOCUMENTS

| AT | 516542 | 6/2016 |
|---|---|---|
| DE | 10 2008 061 412 | 1/2010 |

(Continued)

OTHER PUBLICATIONS

Search Report dated Mar. 3, 2017 which issued in the corresponding European Patent Application No. 16001776.0.

*Primary Examiner* — Muhammad Shafi
(74) *Attorney, Agent, or Firm* — Cozen O'Connor

(57) ABSTRACT

An operating method and device for a permanent brake system of a motor vehicle. The brake system includes a primary and a secondary permanent brake. Each brake generates respective adjustable braking torque components. The first primary brake has a response than the second primary brake. A third braking torque component is adjusted by the secondary brake. The permanent-brake braking request is applied by the first primary brake until the braking request exceeds a first threshold. The first threshold corresponds to a value less than or equal to a maximum braking torque generated by the first primary brake. After exceeding the first threshold, a component of the request is applied by the secondary permanent brake. A second threshold value corresponds to a value less than or equal to a braking torque that can be generated when the first primary permanent brake device interacts with the secondary permanent brake.

11 Claims, 2 Drawing Sheets

(56) References Cited

U.S. PATENT DOCUMENTS

| | | | |
|---|---|---|---|
| 2005/0001474 A1* | 1/2005 | Zierolf | B60T 8/1703 303/112 |
| 2005/0087170 A1* | 4/2005 | Rammer | F01L 13/065 123/321 |
| 2007/0137200 A1 | 6/2007 | Rammer et al. | |
| 2009/0118957 A1* | 5/2009 | Heap | B60W 20/10 701/70 |
| 2009/0118964 A1* | 5/2009 | Snyder | B60W 10/24 701/99 |
| 2010/0006063 A1* | 1/2010 | Dilly | F01L 13/06 123/347 |
| 2012/0017869 A1 | 1/2012 | Rammer et al. | |
| 2012/0130581 A1* | 5/2012 | Semsey | B60T 8/17555 701/22 |
| 2015/0149056 A1* | 5/2015 | Yao | B60T 8/3215 701/71 |
| 2016/0169127 A1 | 6/2016 | Rammer et al. | |
| 2016/0290463 A1 | 10/2016 | Kamossa et al. | |

FOREIGN PATENT DOCUMENTS

| | | |
|---|---|---|
| DE | 102013225954 | 5/2015 |
| EP | 2 123 500 | 11/2009 |
| EP | 2 412 955 | 2/2012 |
| JP | 2000-274264 | 10/2000 |
| WO | WO 2008/008005 | 1/2008 |
| WO | WO 2014/064524 | 5/2014 |

* cited by examiner

OPERATING METHOD AND DEVICE FOR PERFORMING OPEN-LOOP OR CLOSED-LOOP CONTROL FOR A PERMANENT BRAKE SYSTEM OF A VEHICLE

BACKGROUND OF THE INVENTION

1. Field of the Invention

The invention relates to an operating method for a permanent brake system of a motor vehicle and a device for performing open-loop or closed-loop control of a permanent brake system of a vehicle.

2. Description of the Related Art

Permanent brake systems for motor vehicles are known from the prior art. A permanent brake is a device that permits relatively long lasting and also wear-free braking without its braking power decreasing. Permanent brakes are divided into primary and secondary permanent brakes. A primary permanent brake is arranged on the engine side in the force flux upstream of the transmission. Permanent brakes usually act via the crankshaft of the engine and are therefore dependent on the rotational speed. Examples of the primary permanent brakes are engine brakes, for example exhaust brakes, valve-controlled permanent brakes, and/or turbo systems. Secondary permanent brakes are arranged in the force flux downstream of the transmission, for example on the Cardan shaft, and comprise, for example, hydraulically acting retarders or Eddy current brakes. Secondary permanent brakes are often dependent on the vehicle speed. Secondary permanent brakes include hydrodynamic brakes and electromagnetic Eddy current brakes.

In addition, from practice primary permanent brakes are known that have, with respect to the reaction time, a rapid component and a slow component, which can each be actuated separately. If the permanent brake system of the motor vehicle comprises both a primary permanent brake with rapid components, which are different with respect to the reaction time and a secondary permanent brake, the object arises of how an interaction between these three permanent brake components can be implemented, which is as advantageous as possible, in order to generate a corresponding permanent braking torque as a function of a permanent-brake braking request.

SUMMARY OF THE INVENTION

A first object of the invention is therefore to make available an operating method for a permanent brake system with which disadvantages of conventional technologies can be avoided. One object of the invention is, in particular, to make available an operating method with which a reaction time of the permanent brake system is improved and/or the input of heat by the permanent brake system is minimized. A further object is to make available a device for performing open-loop or closed-loop control of such a permanent brake system with which disadvantages of conventional technologies can be avoided.

According to a first aspect of the invention, an operating method for a permanent brake system of a motor vehicle is made available.

The permanent brake system comprises, in a manner known per se, a primary permanent brake and a secondary permanent brake. The secondary permanent brake can be a secondary retarder. The primary permanent brake also has a first primary permanent brake device for generating an adjustable first braking torque component or first braking force component and a second primary permanent brake device for generating an adjustable second braking torque component or second braking force component. The first primary permanent brake device has a more rapid response behaviour compared to the second primary permanent brake device. In other words, the primary permanent brake has, with respect to the reaction time, i.e. how quickly a braking torque can be built up in reaction to a braking torque specification, a rapid component and a slow component. The braking torque that can be generated or is generated overall by the primary permanent brake is therefore obtained by the sum of the two components. A further braking torque component or braking force component can be adjusted by the secondary permanent brake. This braking torque component is referred to below as a third braking torque component.

For example, primary permanent brakes are known that can generate a first braking torque component by performing open-loop control of an engine exhaust brake that has an engine exhaust valve arranged in the exhaust gas section, on which closed-loop control can be performed in the engine braking mode and by which an exhaust gas back pressure can be generated. In order to adjust the first braking torque component, an attitude angle of the engine exhaust valve is adjusted. The primary permanent brake or the engine brake can also be embodied as a decompression brake. The first braking torque component can also be in the form of a combination of an engine exhaust brake and a decompression brake, for example, an exhaust valve brake. Such a mixed form composed of an engine exhaust brake and a decompression brake is known, for example, from DE 2008 061 412 A1.

This first component constitutes the component that is rapid with respect to the reaction time. The primary permanent brake can also comprise an exhaust gas turbo system by which an additional braking torque component can be generated in the permanent brake mode, in which the fuel pump is switched to zero delivery or idle delivery, by performing closed-loop control of the charge pressure and as a result the compression work. This additional component constitutes the component that is relatively slow with respect to the reaction time, since it can take several seconds until the desired charge pressure or back pressure is built up again or reduced again in accordance with an open-loop or closed-loop control specification.

Such an engine brake device is described, for example, in the patent application A910/2014 which has not been published to date.

It is emphasized that the primary permanent brake is not limited to this embodiment but rather the invention can be applied to all primary permanent brakes, the maximum torque that can be generated by primary permanent brake is composed of a first component and a second component which have different speeds with respect to the response behaviour.

The first, second and third braking torque components are defined such that the permanent brake system generates a braking torque at the level of the permanent-brake braking request. The permanent-brake braking request constitutes a set point value specification that indicates the level of a braking torque to be applied by the permanent brake system. The permanent-brake braking request can be generated, for example, by a vehicle longitudinal control system or a cruise control system.

According to one aspect of the invention, at the start of permanent braking it is attempted to form the permanent-brake braking request completely by the rapid component of the primary permanent brake.

Accordingly, according to one aspect of the invention an operating method for a permanent brake system of the generic type is proposed in which the permanent-brake braking request is applied by the first primary permanent brake device, i.e. the rapid component, in a time period after the activation of a permanent brake mode and until a permanent-brake braking request exceeds a first threshold value for the first time after the activation of the permanent brake mode. The first threshold value is defined in such a way that it corresponds to a value that is less than or equal to a maximum braking torque that can be generated by the first primary permanent brake device. The first threshold value can be dependent on the rotational speed.

The use of the rapid component of the primary permanent brake offers the advantage of a relatively rapid reaction time compared to the use of the slow component. In addition, the primary permanent brake generally generates a lower input of heat into the cooling system of the vehicle than the secondary permanent brake. The secondary permanent brake additionally makes available less braking torque at low vehicle speeds, with the result that the use of the rapid component of the primary permanent brake offers the advantage that at the start of permanent braking a braking torque can be generated up to the first threshold value independently of the vehicle speed.

In addition, it is proposed that if and/or after the permanent-brake braking request has exceeded the first threshold value for the first time and as long as the permanent-brake braking request has not yet exceeded a second threshold value after the activation of a permanent brake mode, a component of the permanent-brake braking request that exceeds the first threshold value is applied by the secondary permanent brake. The second threshold value is defined such that it corresponds to a value that is less than or equal to a braking torque, which is the maximum that can be generated when the first primary permanent brake device interacts with the secondary permanent brake. If the rapid component of the primary permanent brake is therefore not sufficient to generate the required braking torque, the rest of the braking torque is corrected by the secondary permanent brake. In this context, use can advantageously be made of the fact that the secondary permanent brake operates rapidly and can be regulated precisely.

Activation of the permanent brake mode is understood to mean switching on of the permanent brake system or the start of the operating phase of the vehicle during which permanent braking torque greater than zero has to be applied by the permanent brake system.

According to one embodiment of the invention, the second primary permanent brake device can be activated after the second threshold value is exceeded for the first time after activation of a permanent brake mode, and therefore the second braking torque component can be activated, which is set in such a way that it corresponds to the difference between the permanent-brake braking request and the sum of the first braking torque component and the third braking torque component. If the braking request exceeds the second threshold value for the first time and therefore can no longer be formed by the sum of the secondary permanent brake and of the rapid component of the primary permanent brake, the slow component of the primary permanent brake is actuated.

Activation of the first or second permanent brake device or of the secondary permanent brake is understood to mean, for example, the time from which the respective actuator element of the permanent brake device is adjusted from a state in which the permanent brake device does not generate any braking torque component into a state which corresponds to a predetermined braking torque component, in order to contribute a braking torque component to the requested permanent-brake braking request.

In one advantageous variant of this embodiment after the secondary permanent brake has been activated, in the case of a subsequent reduction in the permanent-braking request said secondary permanent brake remains activated for longer than the brake devices of the primary permanent brake. In other words when the secondary permanent brake has become effective for the first time, in the case of a reduction in the permanent-brake braking request said secondary permanent brake remains actuated for as long as possible, in particular for longer than the primary permanent brake. As a result, the number of switching-on processes and switching-off processes of the secondary permanent brake can be reduced, which is advantageous from the point of view of comfort.

In the case of a reduction in the permanent-brake braking request, the third braking torque component, generated by the secondary permanent brake, and/or the braking torque component generated by the primary permanent brake are therefore reduced, instead of switching off the secondary permanent brake completely.

According to a further preferred embodiment, a reduction in the permanent-brake braking request that occurs after activation of the second primary permanent brake device is corrected by the secondary permanent brake and/or via the first primary permanent brake device and the second braking force component that has been set remains constant until the value of the permanent-brake braking request drops below a value which corresponds to a level of the instantaneously set, second braking force component of the second primary permanent brake device. If the slow component of the primary permanent brake only then becomes active or activated, this component is to maintain its value for as long as possible even if the permanent-brake braking request drops again. In this way, processes of switching off the second primary permanent brake device and switching it on again and the comparatively long delay which is caused by this can be prevented.

According to a second aspect of the invention, a device for performing open-loop or closed-loop control for a permanent brake system of a motor vehicle is made available. The permanent brake system comprises in turn, as described above for the operating method, a primary permanent brake and a secondary permanent brake, wherein the primary permanent brake has a rapid component and a slow component. The device is configured to carry out the operating method for the permanent brake system as described in this document.

The device is, in particular, configured to actuate the primary permanent brake and the secondary permanent brake as a function of a permanent-brake braking request, the permanent-brake braking request is applied exclusively by the first primary permanent brake device in a time period after the activation of a permanent brake mode and until a permanent-brake braking request exceeds a first threshold value for the first time after the activation of the permanent brake mode. The first threshold value is in turn defined in such a way that it corresponds to a value which is less than or equal to a maximum braking torque that can be generated by the first primary permanent brake device. Furthermore, the device is configured to actuate the primary permanent brake and the secondary permanent brake as a function of a permanent-brake braking request such that after the permanent-brake braking request has exceeded the first threshold value for the first time and as long as the permanent-brake braking request has not yet exceeded a second threshold value after the activation of a permanent brake mode, a component of the permanent-brake braking request that exceeds the first threshold value is applied by the secondary permanent brake. The second threshold value is in turn defined in such a way that it corresponds to a value which is less than or equal to a braking torque which is the maximum which can be generated when the first primary permanent brake device interacts with the secondary permanent brake.

In addition, the device can be configured to activate the second primary permanent brake device after the second threshold value has been exceeded for the first time after activation of a permanent brake mode.

In addition, the device can be configured to actuate the primary permanent brake and the secondary permanent brake in such a way that after the secondary permanent brake has been activated, in the case of a subsequent reduction of the permanent-brake braking request said secondary permanent brake remains activated for longer than the brake devices of the primary permanent brake.

In addition, the device can be configured to correct a reduction in the permanent-brake braking request, occurring after activation of the second primary permanent brake device, by the secondary permanent brake and/or the first primary permanent brake device and to keep constant the second braking torque component which is set, until the value of the permanent-brake braking request drops below a value that corresponds to a level of the instantaneously set, second braking torque component of the second primary permanent brake device.

The invention also relates to a motor vehicle, in particular a utility vehicle, having a permanent brake system and a device for performing open-loop or closed-loop control of the permanent brake system as respectively disclosed in this document.

In order to avoid repetitions, features which are disclosed purely with respect to the method as well as also functional features of the device and therefore apply and can be claimed as being disclosed with respect to the device.

BRIEF DESCRIPTION OF THE DRAWINGS

The preferred embodiments and features of the invention described above can be combined with one another as desired. Further details and advantages of the invention are described below with reference to the appended drawings, in which.

DETAILED DESCRIPTION OF THE PRESENTLY PREFERRED EMBODIMENTS

Figure 1:
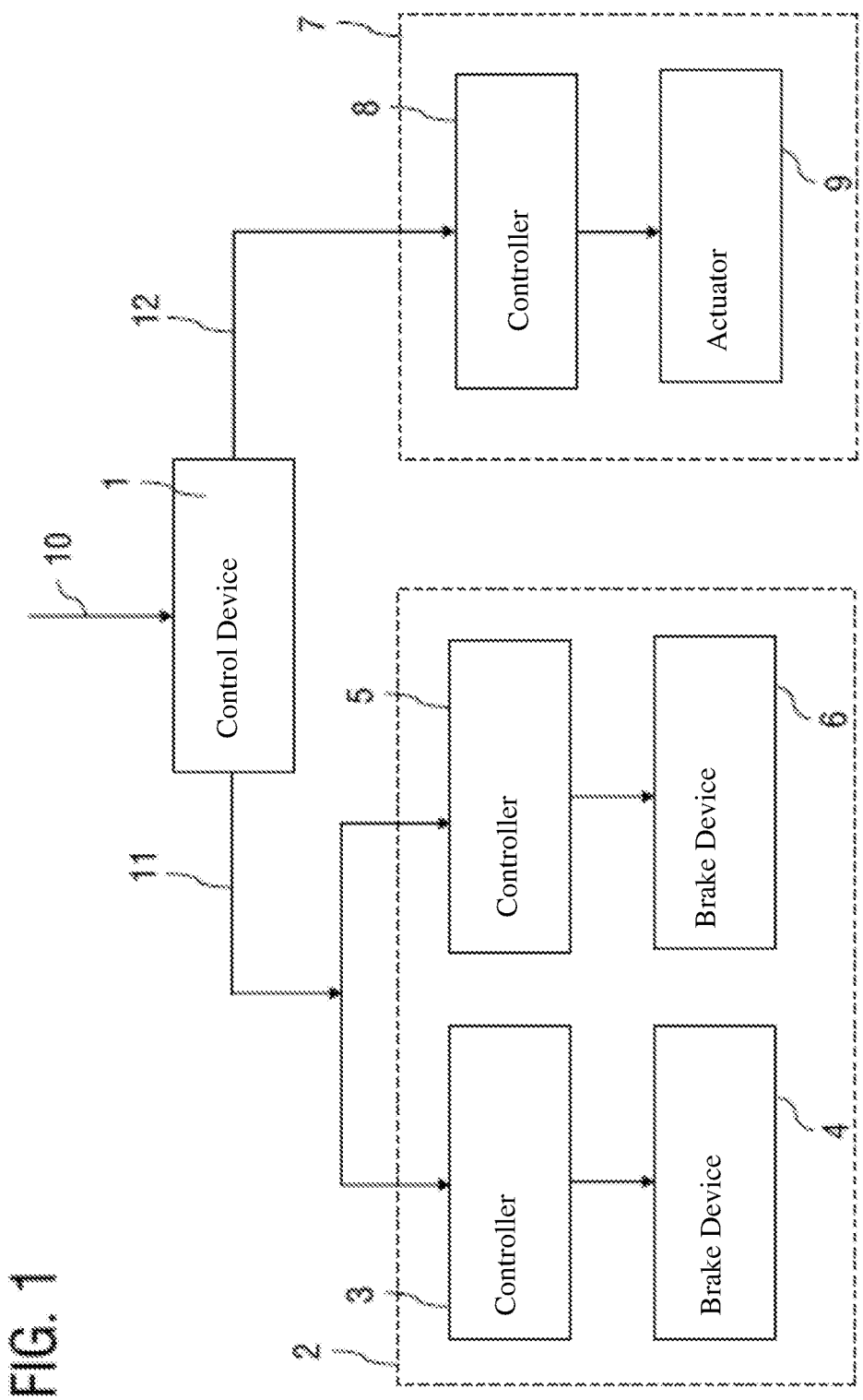
FIG. 1 is a schematic block diagram of a device according to the invention.

FIG. 1 shows a schematic block diagram of a permanent brake system and of a device for performing open-loop control of the permanent brake system. The permanent brake system comprises, in a manner known per se, a primary permanent brake 2 and a secondary permanent brake in the form of a secondary retarder 7.

The primary permanent brake has a first primary permanent brake device 4 for generating an adjustable first braking torque component or first braking force component. The first primary permanent brake device 4 comprises, for example, a combination of an engine exhaust brake and a decompression brake. The engine exhaust brake performs closed-loop control of an exhaust gas back pressure, and therefore of the engine braking power, by changing an attitude angle of an engine exhaust valve (referred to as an exhaust valve). The engine braking effect can be increased by the compression brake by briefly opening the outlet valves of the cylinder.

In this embodiment, in the case of small permanent braking torque specifications only the engine braking effect by the exhaust gas back pressure is used. In the case of a further increase, the additional effect by the decompression brake is used. The decompression brake can be initiated in a fashion which is known per se under gas control by the increased exhaust gas back pressure with an at least partially closed brake valve, during which "chattering" or "valve jumping" of the outlet valves is triggered (see, for example, DE 10 2008 061 412 A1, to which reference is made with respect to the detailed embodiment of the exhaust-gas-controlled decompression brake).

In addition, the primary permanent brake has a second primary permanent brake device 6 for generating an adjustable second braking torque component or second braking force component. The second permanent brake device performs closed-loop control of the charge pressure by a charge pressure closed-loop controller 5, using corresponding control elements, for example by a throttle valve in the intake system and/or by the exhaust gas turbocharger. In this context, the first primary permanent brake device has, in comparison with the second primary permanent brake device, a more rapid response behaviour, i.e. the reaction time of the first permanent brake device, i.e. how quickly a braking torque can be built up in reaction to a braking torque specification, is more rapid than that of the second permanent brake device. This is due to the fact that it takes longer to build up the charge pressure and reduce it again.

Closed-loop control is carried out in the operation and of the braking torque of the secondary retarder 7 by a separate closed-loop controller 8 that performs closed-loop control of the actuator element 9 of the secondary retarder 7. The secondary permanent brake 2 can be a hydrodynamic retarder in which closed-loop control of the quantity of inflowing oil is performed by a compressed-air-activated control valve.

The utility vehicle also comprises a control device 1, which comprises a microprocessor and memory, configured to detect a permanent-brake braking request 10 and to actuate the primary permanent brake 2 and the secondary retarder 7 as a function of the permanent-brake braking request 10. In this context, the detected permanent-brake braking request 10 is divided by the control device 1 into a first braking request 11 for the primary permanent brake and a second permanent-brake braking request 12 for the secondary retarder, and is transmitted to the closed-loop controllers 3 and 5 or 8. The permanent-brake braking request 10 is subsequently also referred to below for short as the braking request 10.

Such a control device 1 is understood to be, in particular, any device arranged and embodied in such a way as to actuate the primary permanent brake and the secondary retarder 7. Said control device does not have to be an independent component, it is also possible for the control device 1 to be an integral component of another controller, for example of a central control unit. The detection of the permanent-brake braking request 10 is understood to mean, in particular, any process of acquiring information on the basis of which deceleration of the vehicle can be initiated by the control device 1 using the permanent brake system. It is possible here, but not necessary, for the permanent-brake braking request 10 to be triggered by a driver assistance system such as a vehicle longitudinal control system (TEMPOPILOT (speed pilot) or BREMSOMAT) or is set manually by a driver by means of an input device.

Figure 2:
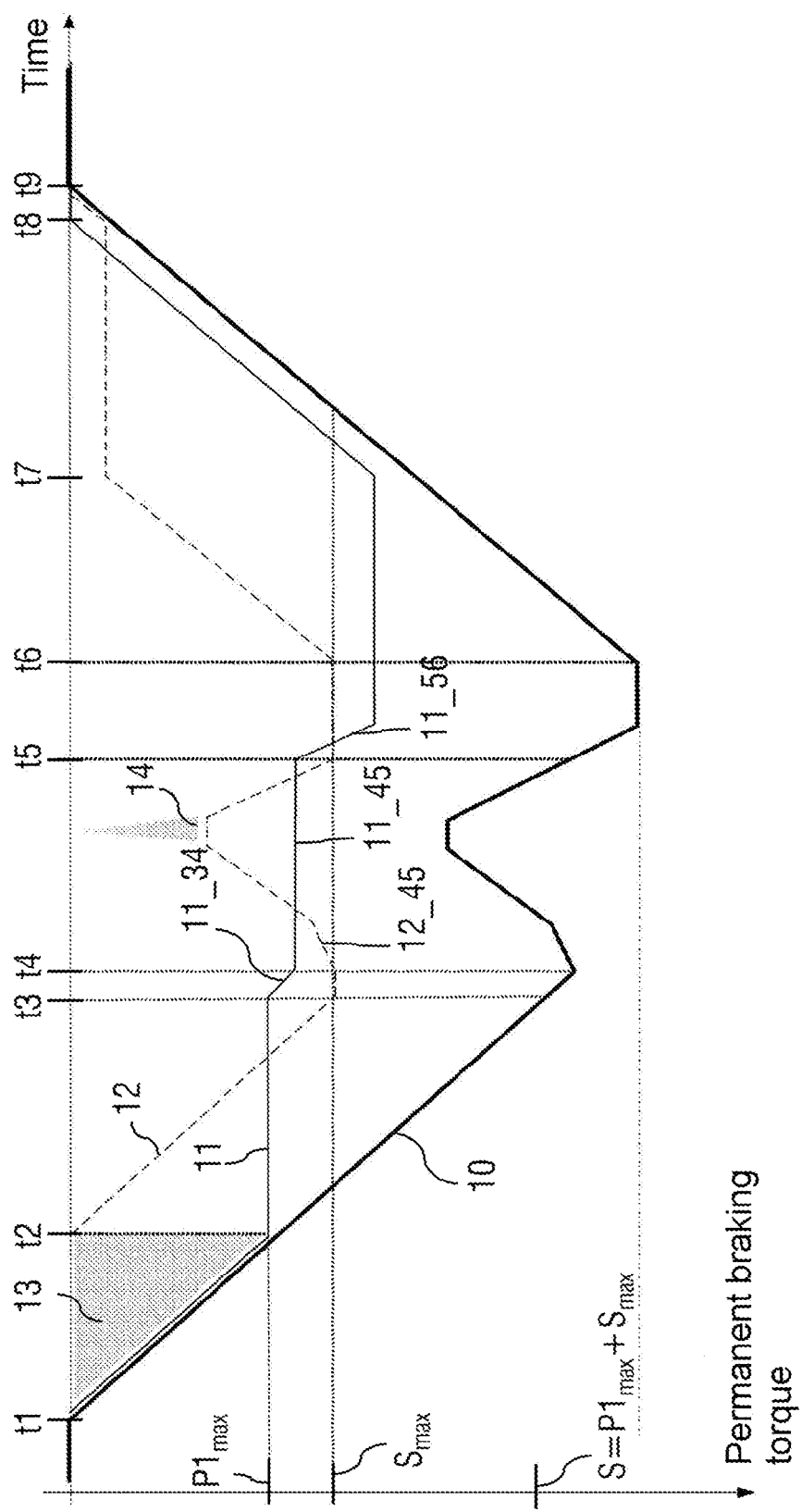
FIG. 2 is a time diagram illustrating the interaction of the primary and secondary permanent brakes in accordance with the invention.

The method of functioning of the control device 1 and an operating method for the permanent brake system are explained below with reference to FIG. 2. Here, the abscissa axis corresponds to the time axis, and the ordinate axis specifies the level of a braking torque or of a braking torque request. FIG. 2 illustrates the time profile of a permanent-brake braking request 10. In addition, FIG. 2 shows the time profile of the permanent-brake braking request generated by the control device 1 for the primary permanent brake, illustrated in FIG. 2 by the curve characterized by the reference symbol 11. The time profile of the permanent-brake braking request generated by the control device 1 for the secondary retarder 7 is illustrated in FIG. 2 by the curve characterized with the reference symbol 12.

In the operating phase before the time t1, no permanent braking torque is requested and a permanent brake mode is not occurring. At time t1, a permanent brake mode is activated on the basis of an increase in the permanent-brake braking request 10, and can be generated, for example, by a driver longitudinal control system on entry into a relatively long section of a route with a negative gradient.

In FIG. 2, the threshold value $P1_{max}$ corresponds to a maximum braking torque which can be generated by the first primary permanent brake device 4 of the primary permanent brake 2. Since the braking torque that can be generated by the primary permanent brake depends on the current engine rotational speed, that of the threshold value $P1_{max}$ is correspondingly also dependent on the engine rotational speed and is continuously recalculated as a function of the current engine rotational speed.

As long as the magnitude of the braking request 10 is below the instantaneous threshold value $P1_{max}$, which is the case in the time period from t1 to t2, the control device 1 passes on the detected braking request 10 with its full magnitude in the form of a braking request 11 to the primary permanent brake 2. The closed-loop controllers 3 and 5 are configured in such a way that in the case of braking requests 11 below the threshold value $P1_{max}$, only the rapid component 4 of the primary permanent brake 2 is actuated. The closed-loop controller 5 therefore does not actuate the slow component 6 in these cases, with the result that the slow component 6 of the primary permanent brake is not effective. In the time period t1 to t2, the braking request 10 is therefore applied completely by the rapid component 4 of the primary permanent brake. The secondary retarder is deactivated, i.e. does not contribute any braking torque at that particular time. This also provides the advantage that a comparatively small input of heat into the cooling system of the vehicle takes place, since the input of heat of the primary permanent brake is low compared to the secondary retarder. The input of heat between t1 and t2 correlates with the area 13.

If the braking request 10 exceeds the first threshold value $P1_{max}$ for the first time at the time t2, i.e. for the first time after the activation of the permanent brake mode that last took place at the time t1, the secondary retarder is activated and it corrects the remaining braking torque, i.e. corrects a component of the braking request 10, which exceeds the threshold value $P1_{max}$.

This correction takes place using the secondary retarder at least until the braking request 10 reaches, by a further increase, a value which can no longer be generated by the interaction of the first primary permanent brake device 4 with the secondary retarder 7. This point is reached at the time t3 in the example in FIG. 2. Here, the braking request 10 reaches a value S which corresponds to a sum of $P1_{max}$ and $S_{max}$, wherein $S_{max}$ corresponds to a maximum braking torque which can be generated by the secondary retarder.

In the time period between t2 and t3, the braking torque component 12, which is transmitted from the control device 1 to the secondary retarder 7, rises from zero to $S_{max}$. In other words, in the time period t2 to t3 the control device 1 divides, for this purpose, the braking request 10 into a first component 11 with the value $P1_{max}$ and into a second component 12 which is sent to the closed-loop controller 8 of the secondary retarder. The value of the second component 12 corresponds to the current value of the braking request 10 minus $P1_{max}$.

Between t3 and t4, the value of the braking request 10 continues to rise. Correspondingly, the control device 1 increases the value of the component 11 (see partial section 11_34 of the braking torque profile 11 of the primary permanent brake between the points t3 and t4) and leaves the component 12 constant. As a result of this, the closed-loop controller 5 actuates the slow component of the primary permanent brake, with the result that this closed-loop controller 8 contributes that component of the braking request 11, which exceeds the value of $P1_{max}$.

If the secondary retarder 7 only becomes active then, in the case of a reduction in the braking request 10, secondary retarder 7 is to remain activated for as long as possible, in particular for longer than the primary permanent brake, in order to avoid processes of switching off and switching on again. In addition, if the slow component 6 of the primary permanent brake is only active then, the component 6 is to maintain its value for as long as possible even if the braking request 10 drops, in order to avoid processes of switching off and switching on again with a large delay.

Correspondingly, fluctuations in the braking request 10 in the section t4 and t5 are corrected by the secondary retarder 7, with the result that the braking torque component 11 of the primary permanent brake can be kept constant in the time period t4 and t5, which is represented by the horizontally extending section 11_45 between t4 and t5. Correspondingly, the control device 1 keeps the component 11 of the braking request 10 constant in this time period and modulates only the component 12 of the secondary retarder, which is represented by the section 12_45. Here, use can also be made of the fact that closed-loop control of the secondary retarder can be performed rapidly and precisely. In the region 14, an input of heat by the small braking torque component of the secondary retarder is reduced.

At the time t5, the braking torque component 12 of the secondary retarder reaches its maximum value $S_{max}$ again. As a result of this, the further increase in the braking request 10 is applied again by the slow component of the primary permanent brake, which is illustrated by the increase in the curve section 11_56. In the time period t5 to t6, the control device 1 therefore keeps the braking torque component 12 of the secondary retarder constant and instead increases the component 11 of the primary permanent brake, after which the closed-loop controller 5 sets a correspondingly increased braking torque by adapting the charge pressure, since the rapid component already contributes the maximum amount $P1_{max}$ which it can generate.

At the time t6, the braking request 10 drops again. So that the rapid component of the primary permanent brake can be kept constant for as long as possible, the braking torque component of the secondary retarder is instead decreased, which can be done by a corresponding reduction in the braking torque request 12 by the control device 1.

It has already been mentioned above that the secondary retarder is to remain actuated for as long as possible, in particular longer than the primary permanent brake, after activation, in order to avoid processes of switching off and switching on again. If the braking torque component 12 of the secondary retarder drops to a predefined minimum value, which is the case at the time t7, the control device 1 subsequently divides the braking request 10 in such a way that the braking torque component of the secondary retarder remains constant for as long as the primary permanent brake is still effective, and that a further reduction in the braking request 10 is applied by correspondingly reducing the braking torque component of the primary permanent brake. Consequently, after the time t7 the braking torque specification 11 of the primary permanent brake 2 drops, while the braking torque specification 12 to the secondary retarder 7 remains constant. Only after this is the primary permanent brake deactivated at the time t8 on the basis of a further reduction in the braking request 10, and the braking torque specification 11 to the secondary retarder is subsequently reduced, with the result that the latter is switched off at the time t9.

Although the invention has been described with reference to specific exemplary embodiments, it is clear to a person skilled in the art that various changes can be carried out and equivalents used as a replacement without departing from the scope of the invention. In addition, many modifications can be carried out without departing from the relevant scope. In addition, the invention is not to be limited to the disclosed exemplary embodiments but instead should comprise all exemplary embodiments which fall within the scope of the appended patent claims. In particular, the invention also claims protection for the subject matter and the features of the dependent claims independently of the claims referred to.

What is claimed:

1. An operating method for a control element having a microprocessor configured for open-loop and closed-loop control for a permanent brake system of a motor vehicle having a primary permanent brake and a secondary permanent brake,
   the microprocessor is issuing instructions for the method comprising:
   generating an adjustable first braking torque component by a first primary permanent brake device of the primary permanent brake;
   generating an adjustable second braking torque component by a second primary permanent brake device of the primary permanent brake, wherein the first primary permanent brake device has a more rapid response behaviour compared to the second primary permanent brake device;
   adjusting a third braking torque component by the secondary permanent brake;
   applying, by the first primary permanent brake device, a permanent-brake braking request in a first time period after activation of a permanent brake mode and until the permanent-brake braking request exceeds a first threshold value ($P1_{max}$) for the first time period after the activation of the permanent brake mode, wherein the first threshold value ($P1_{max}$) corresponds to a value that is less than or equal to a maximum braking torque that can be generated by the first primary permanent brake device, and
   applying, by the secondary permanent brake, a component of the permanent-brake braking request that exceeds the first threshold value ($P1_{max}$), after the permanent-brake braking request has exceeded the first threshold value ($P1_{max}$) for the first time period and as long as the permanent-brake braking request has not yet exceeded a second threshold value after the activation of a permanent brake mode for vehicle deceleration, wherein the second threshold value corresponds to a value that is less than or equal to a braking torque which is the maximum that can be generated when the first primary permanent brake device interacts with the secondary permanent brake.

2. The operating method according to claim 1, further comprising activating the second primary permanent brake device after the second threshold value is exceeded for the first time after the activation of a permanent brake mode.

3. The operating method according to claim 2, wherein after the activation of the secondary permanent brake, in case of a subsequent reduction in the permanent-brake braking request, the secondary permanent brake remains activated for longer than the brake devices of the primary permanent brake.

4. The operating method according to claim 1, wherein
   a reduction in the permanent-brake braking request that occurs after activation of the second primary permanent brake device is corrected by the secondary permanent brake and/or the first primary permanent brake device and
   the second adjustable braking torque component remains constant until the value of the permanent-brake braking request drops below a value that corresponds to a level of an instantaneously set, second adjustable braking torque component of the second primary permanent brake device.

5. The operating method according to claim 1, wherein
   the first primary brake device comprises an engine exhaust brake for building up an exhaust gas back pressure and decompression brake and/or
   the second primary engine brake device generates an engine braking torque by changing a charge pressure of a supercharged internal combustion engine.

6. A device configured to perform one of open-loop control and closed-loop control of a permanent brake system of a motor vehicle,
   wherein the permanent brake system has a primary permanent brake and a secondary permanent brake,
   wherein the primary permanent brake has a first primary permanent brake device configured to generate an adjustable first braking torque component and a second primary permanent brake device configured to generate an adjustable second adjustable braking torque component, wherein the first primary permanent brake device has a more rapid response behaviour compared to the second primary permanent brake device, and
   wherein a third braking torque component is configured to be adjusted by the secondary permanent brake,
   wherein the device is configured to:
   actuate the primary permanent brake and the secondary permanent brake as a function of a permanent-brake braking request,
   wherein the permanent-brake braking request is applied by the first primary permanent brake device in a time period after the activation of a permanent brake mode and until a permanent-brake braking request exceeds a first threshold value ($P1_{max}$) for the first time after the activation of the permanent brake mode, wherein the first threshold value ($P1_{max}$) corresponds to a value that is less than or equal to a maximum braking torque that can be generated by the first primary permanent brake device, and wherein after the permanent-brake braking request has exceeded the first threshold value ($P1_{max}$) for the first time and as long as the permanent-brake braking request has not yet exceeded a second threshold value after the activation of a permanent brake mode, a component of the permanent-brake braking request that exceeds the first threshold value ($P1_{max}$) is applied by the secondary permanent brake, wherein the second threshold value corresponds to a value that is less than or equal to a braking torque that is the maximum that can be generated when the first primary permanent brake device interacts with the secondary permanent brake.

7. The device according to claim 6, wherein the device is configured to activate the second primary permanent brake device after the second threshold value has been exceeded for the first time after activation of a permanent brake mode.

8. The device according to claim 6, wherein in that the device is configured to actuate the primary permanent brake and the secondary permanent brake such that after the secondary permanent brake has been activated, in case of a subsequent reduction of the permanent-brake braking request, the secondary permanent brake remains activated for longer than the brake devices of the primary permanent brake.

9. The device according to claim 6, wherein the device is configured to:
correct a reduction in the permanent-brake braking request, occurring after activation of the second primary permanent brake device, by the secondary permanent brake and/or the first primary permanent brake device and
to keep constant a setting of the second adjustable braking torque component until the value of the permanent-brake braking request drops below a value that corresponds to a level of an instantaneously set, second adjustable braking torque component of the second primary permanent brake device.

10. The device according to claim 6 wherein the permanent brake system has a secondary retarder.

11. A utility vehicle, comprising a device configured to perform one of open-loop control and closed-loop control of a permanent brake system of a motor vehicle,
wherein the permanent brake system has a primary permanent brake and a secondary permanent brake,
wherein the primary permanent brake has a first primary permanent brake device configured to generate an adjustable first braking torque component and a second primary permanent brake device configured to generate an adjustable second adjustable braking torque component, wherein the first primary permantent brake device has a more rapid response behaviour compared to the second primary permanent brake device, and
wherein a third braking torque component is configured to be adjusted by the secondary permanent brake,
wherein the device is configured to:
actuate the primary permanent brake and the secondary permanent brake as a function of a permanent-brake braking request,
wherein the permanent-brake braking request is applied by the first primary permanent brake device in a time period after the activation of a permanent brake mode and until a permanent-brake braking request exceeds a first threshold value ($P1_{max}$) for the first time after the activation of the permanent brake mode, wherein the first threshold value ($P1_{max}$) corresponds to a value that is less than or equal to a maximum braking torque that can be generated by the first primary permanent brake device, and
wherein after the permanent-brake braking request has exceeded the first threshold value ($P1_{max}$) for the first time and as long as the permanent-brake braking request has not yet exceeded a second threshold value after the activation of a permanent brake mode, a component of the permanent-brake braking request that exceeds the first threshold value ($P1_{max}$) is applied by the secondary permanent brake, wherein the second threshold value corresponds to a value that is less than or equal to a braking torque that is the maximum that can be generated when the first primary permanent brake device interacts with the secondary permanent brake.

* * * * *